(12) United States Patent
Ernst

(10) Patent No.: US 6,429,872 B1
(45) Date of Patent: Aug. 6, 2002

(54) METHOD AND APPARATUS FOR REPRESENTING COMPUTER-MODELED OBJECTS

(75) Inventor: Ines Ernst, Berlin (DE)

(73) Assignee: GMD-Forschungszentrum Informationstechnik GmbH, Berlin (DE)

( * ) Notice: Subject to any disclaimer, the term of this patent is extended or adjusted under 35 U.S.C. 154(b) by 0 days.

(21) Appl. No.: 09/038,049

(22) Filed: Mar. 11, 1998

(30) Foreign Application Priority Data

Mar. 11, 1997 (DE) .......................... 197 12 076
Mar. 20, 1997 (DE) .......................... 197 13 466

(51) Int. Cl.$^7$ ................................. G09G 5/00
(52) U.S. Cl. ......................... 345/584; 345/426
(58) Field of Search ................ 345/433, 429, 345/426, 584, 645

(56) References Cited

FOREIGN PATENT DOCUMENTS

DE         19606356        2/1997

OTHER PUBLICATIONS

Ernst et al. "Gouraud Bump Mapping". Workshop on Graphics Hardware, Lisbon Portugal. pp. 47–53, 1998.*
Foley et al. Computer Graphics: Principles and Practice, 1990, section 16.3 "Surface Detail", pp 741–745, 1990.*
Fellner: "Computer Grafik". In: BI, Wissenschaftsverlag, Mannheim, Wien, Zuerich, 1988, pp. 341–358.

* cited by examiner

*Primary Examiner*—Mark Zimmerman
*Assistant Examiner*—Philip H. Stevenson
(74) *Attorney, Agent, or Firm*—Venable; George H. Spencer; Catherine M. Voorhees

(57) ABSTRACT

In an apparatus and method for representing computer-modeled objects comprising a plurality of adjacent polygon surfaces, the image impression in the corner points of the polygon surfaces is calculated according to a local illumination model, whereas the image impression of the remaining pixels is interpolated according to the Gouraud shading method, and a color or brightness value is additionally calculated for simulating a surface structure for each pixel, the value taking into consideration the influence of the surface structure on the image impression without necessitating a complicated calculation of the local illumination model in each pixel.

11 Claims, 4 Drawing Sheets

METHOD AND APPARATUS FOR REPRESENTING COMPUTER-MODELED OBJECTS

BACKGROUND OF THE INVENTION

The invention relates to a method for representing a computer-modeled object, as defined in the preamble to claim 6, and an apparatus for executing the method, as defined in the preamble to claim 6.

In computer-graphics systems, bodies are usually simulated with grid models that are described by the spatial coordinates of the node points. To represent the polygon surfaces lying between the node points on a screen, the spatial coordinates of the node points are then converted from the three-dimensional coordinate system, for example through central projection, into a two-dimensional screen-coordinate system.

The image impression of the individual polygon surfaces is calculated in perspective, with the position and orientation of the polygon surface relative to the light sources and the predetermined observer's location being considered in order to achieve the most natural image impression possible.

It is also known that the image impression should not be calculated all at once for the entire polygon surface, but the individual polygon surfaces should be divided into a plurality of pixels, and an image impression should be calculated individually for each pixel, so even a relatively crude grid model having large polygon surfaces can be used to attain a natural image impression. To this end, so-called shading methods are used to calculate the shading—that is, the color or brightness gradation—within the polygon surface.

One shading method of this type is referred to as Phong shading. In this method, a data set is predetermined for each polygon surface; the local surface normal at the corner points of the polygon surface ensues from this set, so a curved polygon surface can also be realized, which further improves the degree of realism in the representation of an image. For each pixel within the polygon surface, the local surface normal resulting from the curvature of the polygon surface is interpolated from the predetermined corner-point normals. The image impression of the individual pixels is then calculated with the consideration of the local surface normal, according to a local illumination model.

While the above-described Phong shading advantageously permits a very natural image impression by taking into consideration the curvature of the individual polygon surfaces, the calculation is very complicated because the local illumination model for each pixel must be calculated.

An advantage of Phong shading, however, is the possibility of simulating a surface structure of the individual polygon surfaces without it being necessary to refine the grid model accordingly. For example, in representing a wood surface, it is possible to simulate the wood grain. For this purpose, a two-dimensional storage matrix (bump map) is provided, which defines the desired surface structure, with each storage location containing an inclination value that indicates how the local surface normal is inclined due to the surface structure; each pixel of the polygon surface is associated with a storage location of the storage matrix. In the calculation of the image impression of the individual pixels, first the associated storage location of the storage matrix is specified, and the inclination value representing the surface structure is read out. In the calculation of the image impression corresponding to the local illumination model, the interpolated local surface normal of the smooth polygon surface is not considered, but rather the local surface normal that is changed corresponding to the inclination value. This process utilizes the fact that the position of the pixel is not decisive for the image impression of a pixel of a relief-structured surface, but rather the change in the local surface normal caused by the surface structure is decisive.

However, the above-described simulation of a surface structure basically presupposes a shading method that interpolates the local surface normal individually for each pixel and calculates the image impression according to a local illumination model for each pixel, because the inclination of the local surface normal can only be considered in the calculation of the local illumination model. Up to now, therefore, so-called bump mapping has only been possible in connection with relatively complicated shading methods.

A significantly simpler shading method is known as Gouraud shading. In this instance, too, a data set is predetermined for each polygon surface, from which the spatial position of the local surface normals at the corner points of the polygon surface ensues. In contrast to the above-described Phong shading, however, the local illumination model is only calculated for the corner points of the polygon surface; in contrast, the image impression of the pixels within the polygon surface is interpolated from the image impression at the corner points of the polygon surface as a function of the position of the respective pixel within the polygon surface.

On the one hand, this saves calculation time in comparison to Phong shading, because the complicated calculation of the local illumination model is only effected at the corner points of the polygon surface, while the interpolation of the image impression for the individual pixels is considerably simpler in terms of the calculation effort.

On the other hand, the image impression in Gouraud shading is less natural than in the more complicated Phong shading, and it is not possible to simulate a surface structure (bump mapping) in the above-described manner.

SUMMARY OF THE INVENTION

It is therefore an object of the invention to provide a method of representing computer-modeled objects that also permits the simulation of a surface structure, with the least possible calculation effort, and without necessitating a corresponding refinement of the grid model. It is a further object of the invention to provide a corresponding apparatus for executing a method of this type.

These objects are accomplished by a method including the steps of: calculating at least one surface normal of a polygon surface from a first parameter set that predetermines the spatial position of individual polygon surfaces; calculating at least one global color value for the polygon surface as a function of the respective calculated surface normal; dividing the polygon surface into a plurality of pixels and calculating a respective coordinate set (X, Y, Z) which represents the spatial position of a respective pixel from the first parameter set; interpolating a first local color value for each individual pixel and the at least one calculated global color value of the polygon surface; individually addressing a first storage matrix with a plurality of storage locations for each individual pixel as a function of the respective coordinate set (X, Y, Z), each storage location of the first storage matrix containing an inclination value for simulating a surface structure of the polygon surface where the inclination value determines the inclination of the local surface normal due to the surface structure; reading out the inclination value for each individual pixel from the addressed storage location of the first storage matrix; calculating a second local color value that takes into consideration the influence of the surface structure on an image impression as a function of the read-out inclination value; and calculating a third local color value from the first local color value and the second local color value where the third local color value is the ultimate color value and serves in image representation for the individual pixels.

According to the invention, the apparatus for executing the method of representing a computer-modeled object that is simulated by a plurality of a adjacent polygon surfaces including an input for receiving the first parameter set, a second parameter set that determines a viewer's perspective, and an illumination-data set which determines spatial position and irradiation properties of at least one light source; a first assembly for calculating at least one surface normal of the polygon surface from the first parameter set, a second assembly for calculating at least one global color value for a polygon surface as a function of the at least one calculated surface normal; a third assembly for dividing the polygon surface into a plurality of pixels and for calculating a respective coordinate set (X,Y Z) that represents the spatial position of a respective pixel; a fourth assembly for interpolating a first local color value for each individual pixel from the respective coordinate set (X, Y, Z) and the calculated at least one global color value for the polygon surface; a first storage matrix for simulating a surface structure, said storage matrix having a plurality of storage locations with each storage location containing an inclination value that determines the inclination of the at least one surface normal due to the surface structure; an addressing unit for addressing the first storage matrix individually for each pixel as a function of the coordinate set (X, Y, Z) of the respective pixel; a fifth assembly for calculating a second local color value, that takes into consideration the influence of the surface structure, as a function of the inclination value that has been read out of the first storage matrix; and a sixth assembly for mixing the first and second local values to form a third local color value which is subsequently written in to a screen memory.

The invention includes the technical teaching of combining the techniques of Gouraud shading and so-called bump mapping, which are known per se, in a method for representing computer-modeled objects.

The measures employed in the invention can be performed with both purely software-based measures and suitable special hardware. The hardware-based solution has the advantage that operations performed simultaneously in parallel assemblies yield significant time advantages.

If "assemblies" are discussed below, they may also involve functional groups, for example in the form of electrical circuits. It may also be that one and the same assembly or functional group consecutively performs different operations, as is generally the case in processor technology. As explained above, however, speed advantages can be attained if functional groups are active adjacently and in parallel.

In accordance with the invention, the image impression is calculated by a calculation unit that is a component of a superordinate graphics system, and obtains from this system all of the data that are necessary for calculating the image impression of a respective polygon surface.

Thus, the calculation unit of the invention obtains a first parameter set from the superordinate graphics system, which set represents the spatial position of the polygon surface to be represented. The first parameter set contains, for example, the spatial coordinate values of the corner points of the polygon to be represented, or the spatial coordinate values of the surface's center of gravity, as well as the components of the normal vector of the polygon surface. The only decisive factor for the composition of the first parameter set is that the set unambiguously represent the spatial position of the polygon surface.

The calculation unit further receives a second parameter set, which determines the perspective of the viewer and defines, for example, the spatial coordinates of the viewer's location or viewing direction. By changing this second parameter set, it is possible in a simple manner to change the viewer's perspective of the objects to be represented, and thereby allow him to "wander" through a spatial scene, for example.

The calculation unit further receives an illumination-data set from the superordinate graphics system, which set defines the optical properties of the illumination. The illumination-data set preferably includes the spatial coordinates of the light sources and their irradiation properties.

From these data, a first assembly of the calculation unit determines at least one surface normal for the respective polygon surface so that the image impression can subsequently be calculated according to a local illumination model. The first assembly preferably uses the first parameter set to calculate the local surface normals at all of the corner points of the respective polygon surface.

According to a local illumination model, a second assembly (shader) of the calculation unit subsequently uses the illumination-data set, the first parameter set and the local surface normals to calculate a color value that represents the image impression. The local illumination model is preferably calculated through, so that a two-dimensional interpolation of the color values within the polygon surface can be performed subsequently. Color value should be understood to be a general term here and hereinafter, and is not limited to chrominance values in the narrow sense, but also encompasses pure luminance values in a monochromatic representation.

To interpolate the color values in accordance with Gouraud shading, a third assembly divides the polygon surface into a plurality of pixels, with a coordinate set that indicates the position of the pixel within the polygon surface being calculated for each pixel.

A fourth assembly performs the actual interpolation for Gouraud shading individually for each pixel as a function of the position of the respective pixel within the polygon surface. In this way, a first local color value is calculated for each pixel, which value does not yet take into consideration any surface structure.

To define a surface structure, the calculation unit of the invention has a two-dimensional storage matrix, each of whose storage locations contains an inclination value that determines the inclination of the local surface normal resulting from the desired surface structure. A predetermined mapping function describes a fixed mapping of the polygon corner points onto the storage matrix addresses. Thus, each pixel of the polygon surface is allocated a storage location of the storage matrix, whose contents then determine the inclination of the local surface normal in this pixel.

The inclination vector, that is, the vector that must be added to the local surface normal of the smooth surface for creating the impression of the relief structure, or a "substitute" surface normal as such, can be stored as an inclination value, for example. If this normal is already stored in normalized form, later angle calculations for determining the illumination components are simplified considerably. It is also possible to store a rotation matrix that defines the rotation of the local surface normal as an inclination value. This is particularly advantageous, because the length of the local surface normal is not changed by a rotation.

The relief structure itself is preferably not stored as a relief in the storage matrix; instead, the inclination of the local surface normal resulting from the course of the surface is stored. The local surface normal that is inclined due to the relief structure can therefore advantageously be calculated relatively quickly and with little calculation effort.

In this connection, it is decisive that the relief value be exclusively dependent on the position of the pixel within the polygon surface, but not on the global position of the pixel or the spatial position of the polygon surface. This is necessary because otherwise the relief structure appearing on the polygon surface would "migrate" on the surface during a movement of the polygon. The storage matrix is therefore addressed individually for each pixel as a function of the respective coordinate set, with the addressing unit ensuring that the association of the individual pixels with the storage locations of the storage matrix is independent of a possible change in the position of the polygon surface.

The surface structure defined by the storage matrix is actually taken into consideration by a fifth assembly of the calculation unit, which reads the inclination value of the respective pixel out of the storage matrix and, in connection with a vector that represents the illumination situation and contains information about the relationship between the point of sight and the light source, the assembly calculates a second local color value that takes into consideration the surface structure.

The vector representing the illumination situation—for example, the so-called half-vector—must be available as additional information (in the described version, 1× per polygon), calculated in advance, transformed into the bump-coordinate system and transmitted. In the calculation of the illumination model at the polygon corners for Gouraud shading, such a vector is already necessary and calculated; in the use of another illumination equation, an adequate vector is necessary.

With the transformation of the half-vector into the bump-coordinate system, the position of the polygon in space is "hidden," and the transformed half-vector contains all of the information for performing "bump mapping."

This procedure avoids a complicated transformation of each individual storage matrix element into the illumination-coordinate system; after only one transformation per polygon has been performed, the local second color value can be calculated in the bump-coordinate system. The illumination is calculated in a specific coordinate system, referred to as a world system (WC). The object to be viewed is described in a suitable model-coordinate system (MC). The coordinate system of storage matrix entries is referred to as a texture bump system (TB). A matrix M (mapping matrix) describes the mapping of a vector v of the TB according to MC (given or determined from the association of object points⇌bump address). A matrix P (model matrix) describes the mapping of a vector v of the MC according to WC. H is the half-vector. In this case:

$v_{WC} = P * v_{MC}$ $v_{MC} = M * v_{TB}$ $v_{WC} = P * M * v_{TB} = A * v_{TB}$ and therefore:

$H_{TB} = A^{-1} * H_{WC}; H_{TBN} = H_{TB} / \|H_{TB}\|$

A sixth assembly then calculates the ultimate local color value for the subsequent actuation of a screen or another output unit by mixing the first and second local color values.

The invention thus permits the simulation of a surface structure in connection with a simple Gouraud-type shading algorithm, so a surface structure can be represented, even in rapid moved-image representations, because of the savings of calculation time.

In an advantageous variation of the invention, which is significant enough to merit protection, the storage matrix directly contains the local surface normal in the respective pixel. In contrast to the conventional methods of bump mapping, no calculation-intensive interpolation of the local surface normal is necessary for the representation, because the storage matrix (bump map) directly contains the local surface normal. To determine the local surface normal in the respective pixel, therefore, it is merely necessary to determine the associated storage location of the storage matrix from the coordinate set of the pixel, and correspondingly address the storage matrix, so the local surface normal can be read out.

In one embodiment of this variation, the local color values for the individual pixels are calculated according to the above-described Phong shading method, which, because of the fast calculation of the local surface normal, is possible without a time-consuming interpolation using the corner-point normals.

In another, contrasting embodiment of this variation, the local color values are calculated for the individual pixels according to the Gouraud shading method—as described above—through interpolation of the color values that have been calculated for the corner points from the local illumination model, while the local surface normals that have been read out of the storage matrix only serve in a later addition of Phong illumination components.

In accordance with another, contrasting embodiment of this variation, the local surface normal that has been read out of the storage matrix serves in addressing a further storage matrix (reflection map), which simulates an envelope surface around the respective pixel. Such reflection maps are known to one of skill in the art; the reflection map is addressed, with the assumption of specular reflection, by the reflected eye vector, whereas, in diffuse reflection, the local surface normal directly addresses the reflection or environment map.

Moreover, the above-described, fast determination of the local surface normal also offers the option of using ray-tracing methods.

As described above, the body or surface intended to be shown on the screen is simulated in the computer as a grid model. The surface therefore comprises numerous polygon surfaces whose spatial position is defined by the spatial coordinates of the node points of the grid model. Triangles are preferably used as polygon surfaces, which offers the advantage that the surface normal of a triangle is unambiguously defined by the spatial coordinates of the corner points, because three points always lie in one plane, while in polygons having more than three corner points, it is possible that the corner points do not lie exactly in one plane, so the surface normal is not defined exactly.

The above-described method is not limited to a monochromatic representation. Rather, the method can be executed successively or in parallel for a plurality of colors—preferably the primary colors. In this instance, a color-dependent reflection or absorption behavior of the surface can also be taken into consideration.

In an advantageous embodiment of the invention, the apparatus is configured as an integrated circuit in a processor system, or as an independent processor whose input receives a parameter set that, among other things, determines the spatial position of a polygon surface. At the output, the apparatus outputs the screen coordinates of individual pixels of the polygon surface, as well as the brightness value of the pixels. The circuit can thus be advantageously incorporated into existing computer-graphics systems.

BRIEF DESCRIPTION OF THE DRAWINGS

Other advantageous modifications of the invention are characterized in the dependent claims and described below in connection with the description of the preferred embodiment of the invention shown in the figures in which:

DETAILED DESCRIPTION OF THE INVENTION

Figure 1:
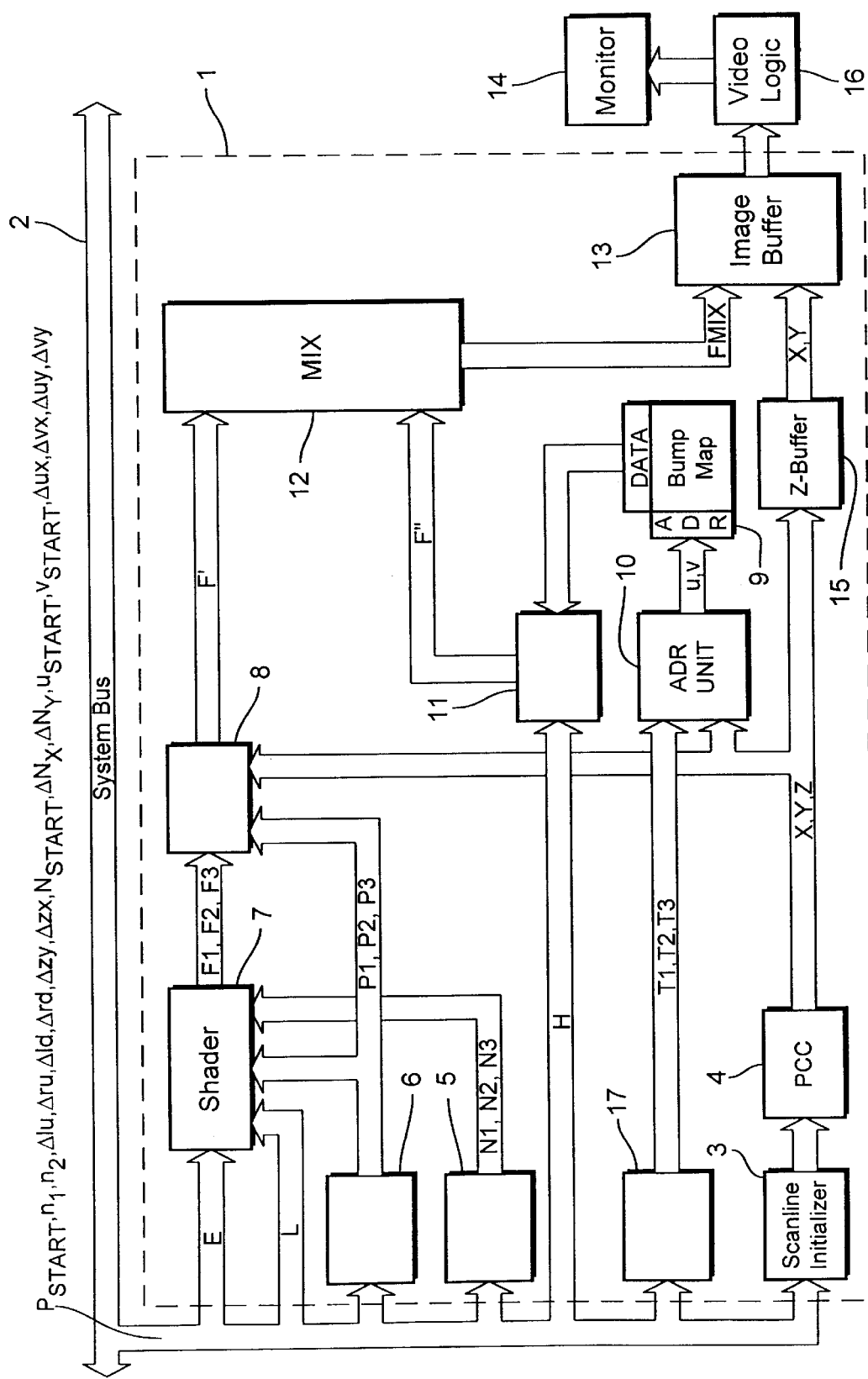
FIG. 1 illustrates a preferred embodiment of the invention, a calculation unit for representing computer-modeled objects, the unit being a component of a comprehensive computer-graphics system.

FIG. 1 shows a calculation unit 1, which permits a representation of computer-modeled objects and is a component of a comprehensive computer-graphics system, of which only a system bus 2 is shown. The individual objects are stored as grid models in the graphics system, and are defined by the spatial coordinates of the node points of the grid model and the optical properties of the triangular polygon surfaces lying between the node points—for example, the color and the reflection properties.

The illustrated calculation unit 1 consecutively calculates the image impressions of all of the polygon surfaces of the individual objects, with the spatial position of the respective polygon surface, the desired perspective and the illumination situation being predetermined by the graphics system via the system bus 2. From the graphics system, the calculation unit 1 obtains a parameter set, via the system bus 2, for each polygon surface to be shown, the set representing the spatial position and the optical properties of the respective polygon surface, and the unit permits a fine division of the polygon surface into a plurality of pixels that are respectively disposed in scanlines. Thus, the parameter set includes the spatial coordinates $(x_s, y_s, z_s)$ of a corner point $P_{Start}$ of the triangle, the edge increments $\Delta lu$, $\Delta ru$, $\Delta ld$, $\Delta rd$, the number of scanlines $n_1$, $n_2$ of the triangle, and the inclination $\Delta zx$ of the triangle surface with respect to the X axis and the inclination $\Delta zy$ of the triangle surface with respect to the Y axis. The parameter set further includes the coordinates of the local surface normal $N_{Start}$ in the predetermined corner point and the vector increments $\Delta N_x$, $\Delta N_y$, which permit a calculation of the local surface normal in each pixel of the triangle surface. The triangle surface is therefore not necessarily planar, but is usually curved, and its curvature is simulated by a surface-normal interpolation, but only for the illumination. On the one hand, this permits an adaptation of the curvature to a predetermined surface course is of the objects. On the other hand, in this way it is possible to attain a smooth and therefore visually inconspicuous transition at the edges between adjacent triangle surfaces. The parameter set also includes the bump-texture coordinates $u_{Start}$, $v_{Start}$ and the associated increments $du_x$, $dv_x$, $du_y$, $dv_y$, which permit a calculation of the local storage-matrix address in each pixel of the triangle surface. The parameter set further includes information about the color of the triangle surface, the absorption behavior, the transparency of the triangle surface and the like.

Figure 2A:
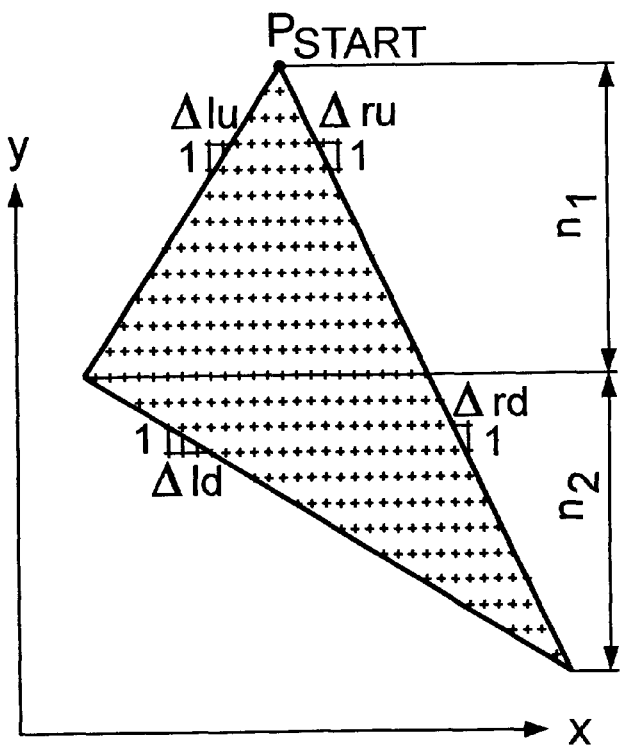
FIGS. 2a, 2b are diagrams explaining the division of the polygon surfaces into pixels.
Figure 2B:
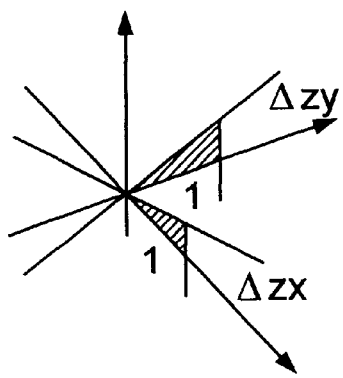

In the calculation unit 1, the parameter set produced by the superordinate graphics system is supplied to, among other components, an assembly 3 (scanline initializer), which first divides the triangle surface into a plurality of scanlines and calculates the spatial coordinates of the initial point $(x_l, y_l, z_l)$ and the end point $(x_r, y_r, z_r)$ for each scanline. FIGS. 2a and 2b show this type of triangle surface for explaining the division into pixels. The individual scanlines are disposed parallel to the X axis and equidistantly from one another, so the Y coordinate of all pixels of a scanline is the result of the Y coordinate $y_s$ of the predetermined corner point $P_{Start}$ and the number i of the scanline. Thus, the following applies for the Y coordinates of the initial point and the end point of the individual scanlines:

$$y_l = y_s + i \quad y_r = y_s + i.$$

The X coordinate $x_l$ of the initial point of each scanline correspondingly results from the X coordinate $x_s$ of the predetermined starting point $P_{Start}$ the number i of the scanline and the edge increment $\Delta lu$ or $\Delta ld$. The edge increment $\Delta lu$ and, subsequently, the edge increment $\Delta ld$ are used within the first $n_1$ scanlines.

$$x_l = x_s + \Delta lu \cdot i$$

for $i \leq n_1$ $$x_l = x_s + \Delta lu \cdot n_1 + (i - n_1) \cdot \Delta ld$$

for $n_1 < i \leq n_1 + n_2$

In the same way, the X coordinate $x_r$ of the end point of each scanline results from the X coordinate $x_s$ of the starting point $P_{Start}$, the number i of the scanline and the edge increment $\Delta ru$ or $\Delta rd$. The edge increment $\Delta ru$ is used during the first $n_1$ scanlines and, subsequently, the edge increment $\Delta rd$ is used:

$$x_r = x_s + \Delta ru \cdot i$$

for $i \leq n_1$ $$x_r = x_s + \Delta ru \cdot n_1 + (i - n_1) \cdot \Delta rd$$

for $n_1 < i \leq n_1 + n_2.$

The Z coordinate $z_s$ of the initial point of each scanline results from the Z coordinate $z_s$ of the starting point $P_{Start}$, the number i of the scanline and the predetermined inclinations of the triangle surface with respect to the X axis and the Y axis:

$$x_l = z_s - i \cdot \Delta zy + (x_l - x_s) \cdot \Delta zx.$$

The assembly 3 then transmits the predetermined inclination value $\Delta zy$ of the triangle surface and the coordinates of the initial point ($x_l$, $y_l$, $z_l$) and the end point ($z_r$, $y_r$, $z_r$) for each scanline to a downstream assembly 4 (PCC—Pixel Coordinate Calculator), which divides the individual scanlines into a plurality of pixels and calculates their coordinates. Because the scanlines extend parallel to the X axis, the Y coordinate of each pixel is identical to the Y coordinate of the associated scanline:

$$y_j = y_l.$$

The X coordinate of each pixel results from the X coordinate $x_l$ of the initial point of the scanline and the number j of the pixel in the scanline:

$$x_j = x_l + j.$$

The Z coordinate of a pixel can be calculated simply from the Z coordinate $z_l$ of the initial point of the associated scanline, the number j of the pixel within the scanline and the inclination $\Delta zx$ of the triangle surface relative to the X axis:

$$z_j = z_l + j \cdot \Delta zy.$$

The assembly 4 thus calculates the coordinates X, Y, Z for each pixel of the polygon surface, which is a prerequisite for a later interpolation of the color values and the storage-matrix addresses within the polygon surface.

The parameter set produced by the superordinate graphics system is also supplied to a further assembly 5 of the calculation unit 1, which calculates the local surface normals N1, N2, N3 at the corner points P1, P2, P3 of the triangular polygon surface, so that it is possible later to calculate the color value F1, F2 or F3 at the corner points, according to a local illumination model.

The parameter set produced by the superordinate graphics system is also supplied to a further assembly 6, which calculates the coordinates of the three corner points P1, P2, P3 of the triangular polygon surface.

The coordinates of the corner points P1, P2, P3 calculated by the assembly 6, as well as the components of the normal vector N1, N2, N3 at the corner points P1, P2, P3, which have been determined by the assembly 5, are then supplied to a further assembly 7, which calculates the image impression at the three corner points according to a local illumination model. In addition to the information about the spatial position and the surface normal in the corner points, the assembly 7 requires information about the illumination situation and the desired perspective. For this purpose, the superordinate graphics system supplies, via the system bus 2, a parameter set E, which determines the position of a virtual viewer and thus the perspective. For each light source, the assembly 7 further receives an illumination-data set L, which represents the position of the primary-beam direction and the intensity of the light source.

Figure 3:
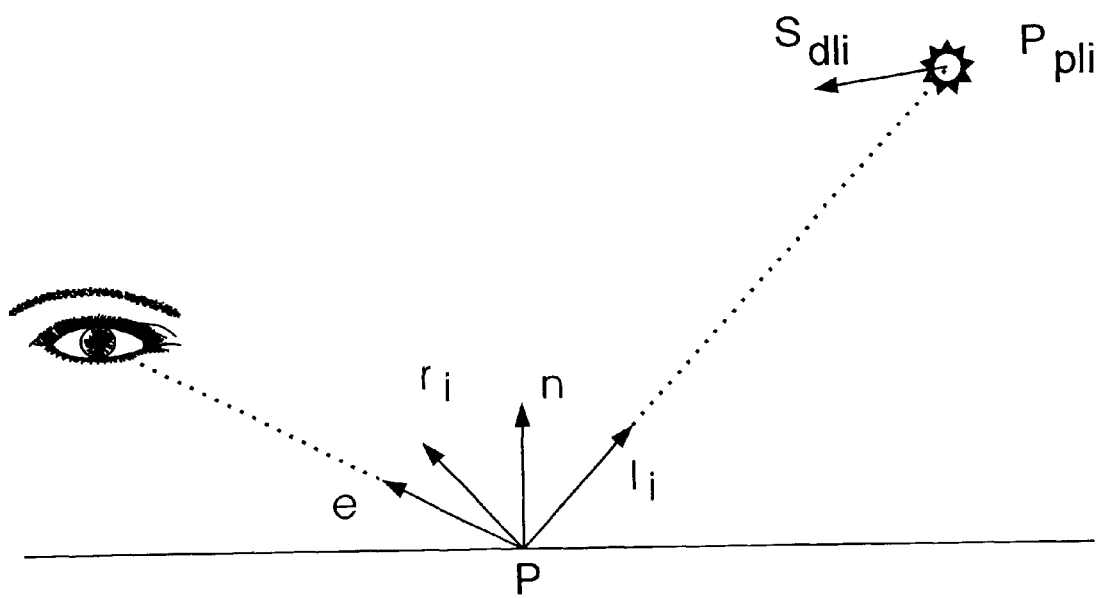
FIG. 3 is a schematic representation of the illumination situation for explaining the local illumination model.

The image impression at the respective corner point is calculated separately for the three primary colors red, green and blue of the RGB color model, corresponding to the local illumination model shown schematically in FIG. 3, which uses the formula:

$$c = e_{cm} + a_{cm} \cdot a_{cs} +$$

$$\sum_{i=0}^{n-1} (att_i)(spot_i) \left[ a_{cm} \cdot a_{cli} + \left( \frac{P}{n} \cdot \frac{P}{l_i} \right) d_{cm} \cdot d_{cli} + \left( \frac{P}{r_i} \cdot \frac{P}{e} \right)^{s_{rm}} s_{cm} \cdot s_{cli} \right]$$

with $$att_i = \frac{1}{k_{0i} + k_{1i} \left\| \frac{P}{l_i} \right\| + k_{2i} \left\| \frac{P}{l_i} \right\|^2} \quad \text{(distance attenuation)}$$

$$spot_i = \begin{cases} -\left( \frac{P}{l_i} \cdot \frac{P}{s_{dli}} \right)^{s_{rli}} & \text{pixel within the cutoff angle } c_{rli} \\ 0 & \text{otherwise} \end{cases}$$

(spotlight attenuation)

$a_{cm}$, $d_{cm}$, $s_{cm}$ ambient, diffuse and specular color, respectively, of the material $e_{cm}$ emissive color of the material $s_{rm}$ specular exponent of the material $a_{cli}$, $d_{cli}$, $s_{cli}$ ambient, diffuse and specular color, respectively, of the light source i $p_{pli}$ position of the light source i $s_{dli}$ primary beam direction of the light source i $s_{rli}$ spotlight exponent of the light source i $c_{rli}$ spotlight cutoff angle of the light source i $k_{0i}$, $k_{1i}$, $k_{2i}$ constant, linear and quadratic distance attenuation, respectively, of the light source i $a_{cs}$ ambient color of the scene For each of the three corner points, a color value F1, F2 or F3, which represents the intensity of the three primary colors for the respective corner point, appears at the output of the assembly 7.

The corresponding color values for the pixels within the polygon surface are then interpolated from the color values F1, F2, F3 at the corner points, as a function of the position of the respective pixel within the polygon surface. To this end, a further assembly 8 is provided, which is connected to the assembly 7 for receiving the color values F1, F2, F3 determined for the corner points, and the assembly 8 receives the coordinates of the respective pixel from the assembly 4. The assembly 8 therefore outputs a color value F' for each pixel, which value results from the interpolation of the color values determined for the corner points corresponding to the local illumination model.

The illustrated calculation unit 1 of the invention further permits the simulation of a surface structure of the polygon surface without necessitating a corresponding reduction in the polygon surface. The desired surface structure is defined by a two-dimensional storage matrix 9, each of whose storage locations contains an inclination value that determines the inclination of the local surface normal due to the surface structure, and thus contains a partial map of the surface structure to be simulated.

The parameter set produced by the superordinate graphics system is supplied to a further assembly 17, which calculates the storage-matrix addresses T1=(u1, v1), T2=(u2, v2), T3=(u3, v3) of the three corner points of the triangular polygon surface.

A storage location of the storage matrix 9, and thus an inclination value, are allocated to each pixel of the polygon surface by an addressing unit 10; it is important that the allocation of the individual pixels to the associated storage locations of the storage matrix 9 be independent of a possible change in position of the polygon surface, because the surface structure to be simulated would otherwise migrate on the polygon surface during a change in position of the polygon surface.

The addressing unit 10 therefore receives both the coordinates X, Y, Z of the respective pixel and the texture addresses T1, T2, T3 of the three corner points of the polygon surface, and uses them to calculate address values u, v for addressing the two-dimensional storage matrix 9.

The inclination value that has been read out of the storage matrix 9 for the respective pixel is then supplied to an assembly 11, which uses it, in connection with the aforementioned half-vector, to calculate a further local color value F" at this location for the respective pixel, which value represents the surface structure to be simulated.

The color value F' determined through Gouraud interpolation is then supplied, along with the color value F" calculated corresponding to the surface structure, to a further assembly 12, which determines the ultimate color value $F_{MIX}$ by mixing the two color values F', F"; this value is subsequently written into a screen memory 13.

To display an image on a screen 14, it is also necessary to convert the three-dimensional coordinates X, Y of the individual pixels into a two-dimensional screen-coordinate system that indicates the position of the respective pixel on the screen 14. The coordinates X, Y, Z calculated by the assembly 4 are therefore supplied to an assembly 15, also called a Z filter, which sorts visible and invisible points according to Z values.

Following the calculation of the color values of all pixels of all polygon surfaces, the screen memory 13 contains a view in perspective of the virtual spatial scene. This image is then reproduced by a screen drive circuit 16 connected on the input side to the screen memory 13, and the screen 14.

Figure 4:
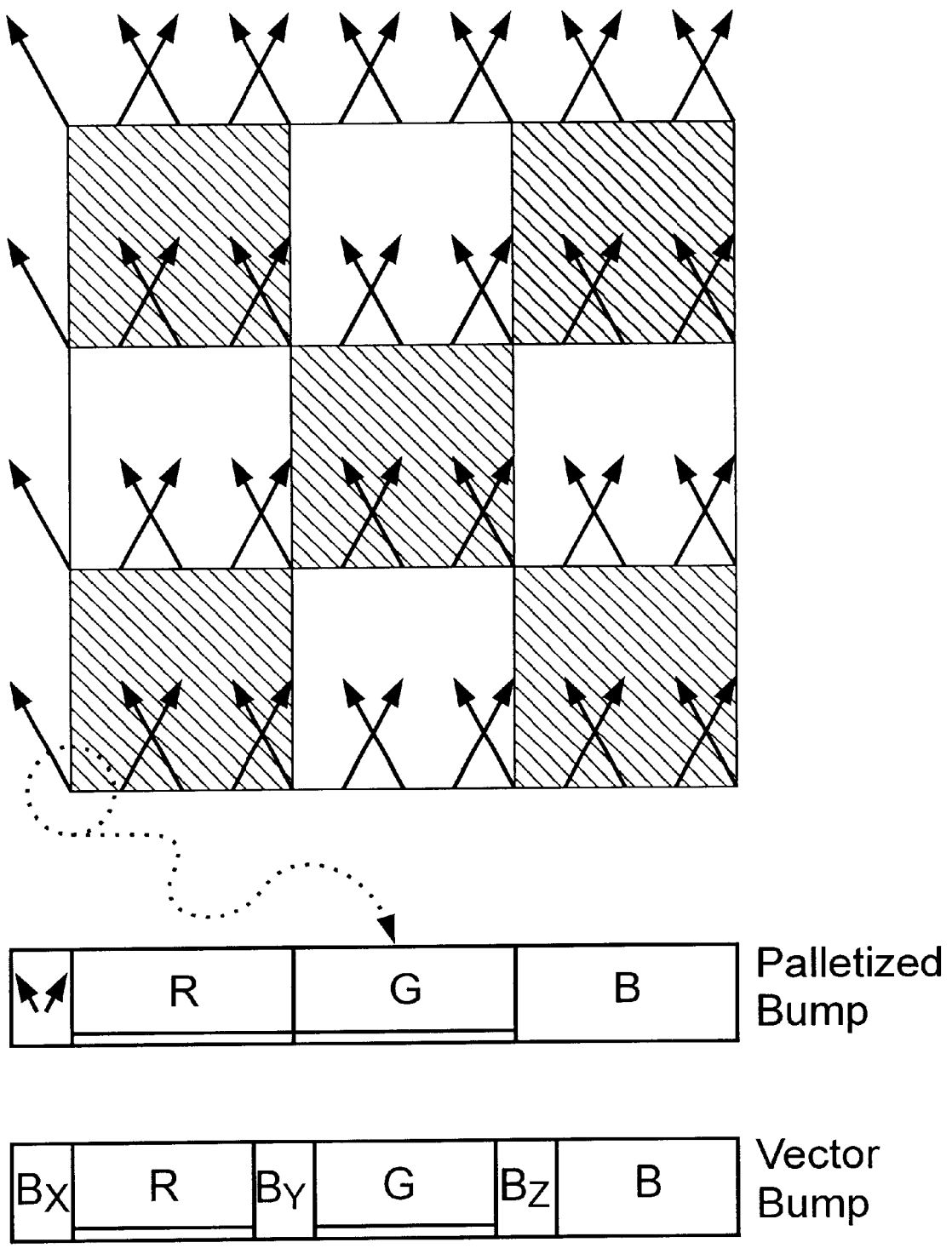
FIG. 4 is a diagram for explaining the impression of a vector field and a texture onto a polygon surface.

FIG. 4 shows a diagram explaining a special variation of the invention, in which each storage location of the storage matrix (bump map) directly contains the local surface normal of the respective pixel, so Phong shading is possible without a complicated interpolation of the local surface normal in the individual pixels. To determine the local surface normal, therefore, only a reading access to the storage matrix is necessary; the storage matrix is addressed as a function of the position of the respective pixel within the polygon surface.

Each storage location of the storage matrix also includes a texture value for the associated pixel, so a texture can be simulated in addition to the relief structure.

The invention is not limited in its embodiment to the above-described, preferred embodiments. Rather, numerous variations are conceivable that make use of the illustrated solution, even in fundamentally different embodiments.

What is claimed is:

1. A method for representing a computer-modeled object that is simulated by a plurality of adjacent polygon surfaces where spatial positions of the individual polygon surfaces are predetermined by a first parameter set, the perspective of a viewer is predetermined by a second parameter set, and the spatial position and the irradiation properties of at least one light source is predetermined by an illumination-data set, the method comprising the following steps for each individual polygon surface:

calculating at least one surface normal of the polygon surface from the first parameter set;

calculating at least one global color value for the polygon surface as a function of the respective calculated surface normal, said global color value corresponding to a local illumination model;

dividing the polygon surface into a plurality of pixels and calculating a respective coordinate set (X, Y, Z) from the first parameter set, said respective coordinate set representing the spatial position of a respective pixel of the plurality of pixels;

interpolating a first local color value for each individual pixel, as a function of the respective coordinate set (X, Y, Z) and the at least one calculated global color value of the polygon surface;

individually addressing a first storage matrix for each individual pixel, as a function of the respective coordinate set (X, Y, Z), each storage location of the first storage matrix containing an inclination value for simulating a surface structure of the polygon surface where the inclination value determines the inclination of the local surface normal resulting from the surface structure;

reading out the inclination value for each individual pixel from the addressed storage location of the first storage matrix;

transforming a vector representing an illumination situation of the illumination-data set into a bump-coordinate system;

calculating a second local color value as a function of a scalar product of the local surface normal and the transformed vector, said second local color value taking into consideration the influence of the surface structure on an image impression which is a function of the read-out inclination value; and calculating a third local color value from the first local color value and the second local color value, said third local color value being the ultimate color and serving in image representation for the individual pixels.

2. The method according to claim 1, wherein the step of calculating at least one surface normal calculates surface normals at corner points of the polygon surface, the inclination value that has been read out of the first storage matrix and the calculated surface normals being used to calculate a local, inclined surface normal, and the step of calculating the second local color is achieved as a function of the scalar product of the inclined local surface normal and the transformed vector.

3. The method according to claim 1, characterized in that the color values (F1, F2, F3) are calculated according to the local illumination model for the corner points (P1, P2, P3) of the respective polygon surface.

4. The method according to claim 3, characterized in that the first local color value (F') for the individual pixels is interpolated in two dimensions from the color values (F1, F2, F3) calculated for the corner points (P1, P2, P3) according to the local illumination model.

5. The method according to claim 1, characterized in that a second storage matrix is addressed individually for each pixel as a function of the coordinate set of the respective pixel, with each storage location of the second storage matrix containing a predetermined texture value for texture simulation, and the third local color value ($F_{MIX}$) is calculated as a function of the texture value that has been read out of the second storage matrix.

6. A system for executing a method of representing a computer-modeled object comprising:

an input for receiving a first parameter set, a second parameter set and an illumination-data set where the first parameter set determines spatial position of individual polygon surfaces, the second parameter set determines a viewer's perspective and the illumination-data set determines spatial position and irradiation properties of at least one light source;

a first assembly for calculating at least one surface normal of the polygon surface from the first parameter set;

a second assembly for calculating at least one global color value for the polygon surface as a function of the calculated surface normal, said global color value corresponding to a local illumination model;

a third assembly for dividing the polygon surface into a plurality of pixels and for calculating a respective coordinate (X, Y, Z) that represents the spatial position of the respective pixel;

a fourth assembly for interpolating a first local color value for each individual pixel from the respective coordinate set (X, Y, Z) and the at least one calculated global color value of the polygon surface, a first storage matrix for simulating a surface structure, said first storage matrix having a plurality of storage locations with each storage location containing an inclination value that determines the inclination of the at least one surface normal due to the surface structure and means for transforming a vector representing an illumination situation into a bump-coordination system;

an addressing unit for addressing the first storage matrix individually for each pixel as a function of the coordinate set (X, Y, Z) of the respective pixel;

a fifth assembly for calculating a second local color value as a function of a scalar product of the local surface normal and the transformed vector, said second local color taking into consideration the influence of the surface structure, which is a function of the inclination value that has been read out of the first storage matrix;

a sixth assembly for mixing the first local color value and the second local color value to form a third local color value where the third local color value is the ultimate color and serves as an image representation for the individual pixels for subsequent actuation of a screen.

7. The apparatus according to claim 6, wherein each storage location of the first storage matrix contains a normalized vector or a rotation matrix for defining the surface structure.

8. The apparatus according to claim 6, further comprising a second storage matrix for texture simulation, the second storage matrix being connected on the input side to the addressing unit for individually addressing each pixel, and with each storage location of the second storage matrix containing a texture value for the associated pixel.

9. A method for representing a computer-modeled object that is simulated by a plurality of adjacent polygon surfaces where the spatial position of the individual polygon surfaces is predetermined by a first parameter set, the perspective of the viewer is predetermined by a second parameter set, and the spatial position and the irradiation properties of at least one light are predetermined by an illumination-data set, the method comprising the following steps for the individual polygon surfaces:

dividing the polygon surface into a plurality of pixels and calculating a coordinate set, which represents the spatial position of a respective pixel of the plurality of pixels, from the first parameter set;

individually addressing a first storage matrix for each individual pixel, as a function of the respective coordinate set, said first storage matrix having a plurality of storage locations where each storage location of the first storage matrix contains a local surface normal of an associated pixel for simulating one of a surface curvature and a surface structure;

transforming a vector representing an illumination situation determined by the illumination-data set into a bump coordinate system; and calculating a local color value for individual pixels as a function of the respective coordinate set, the local surface normal and the transformed vector.

10. The method according to claim 9, wherein the local color value for the individual pixels is calculated as a function of the respective coordinate set, the local surface normal and the illumination-data set, according to a local illumination model.

11. The method according to claim 9, further comprising the step of addressing a second storage matrix using the local surface normal that has been read out of the first storage matrix, the second storage matrix simulating a cubic envelope surface around the respective pixel, and each storage location of the second storage matrix being associated with a surface element of the envelope surface and containing the local color value.

* * * * *